(12) United States Patent
Chou et al.

(10) Patent No.: US 12,475,943 B2
(45) Date of Patent: Nov. 18, 2025

(54) MEMORY DEVICE ADJUSTING REFERENCE VOLTAGE SIGNAL

(71) Applicants: TAIWAN SEMICONDUCTOR MANUFACTURING COMPANY, LTD., Hsinchu (TW); NATIONAL TAIWAN UNIVERSITY, Taipei (TW)

(72) Inventors: Tao Chou, New Taipei (TW); Hsin-Cheng Lin, Taipei (TW); Jih-Chao Chiu, New Taipei (TW); Chee-Wee Liu, Taipei (TW)

(73) Assignees: TAIWAN SEMICONDUCTOR MANUFACTURING COMPANY, LTD., Hsinchu (TW); NATIONAL TAIWAN UNIVERSITY, Taipei (TW)

( * ) Notice: Subject to any disclaimer, the term of this patent is extended or adjusted under 35 U.S.C. 154(b) by 189 days.

(21) Appl. No.: 18/448,479

(22) Filed: Aug. 11, 2023

(65) Prior Publication Data

US 2025/0054536 A1 Feb. 13, 2025

(51) Int. Cl.
*G11C 11/419* (2006.01)
(52) U.S. Cl.
CPC .................. *G11C 11/419* (2013.01)
(58) Field of Classification Search
CPC ............................................. G11C 11/41–419
See application file for complete search history.

(56) References Cited

U.S. PATENT DOCUMENTS 10,878,855 B1 * 12/2020 Lin ..................... G11C 5/14

OTHER PUBLICATIONS

Chang et al., "A 5-nm 135-Mb SRAM in EUV and High-Mobility Channel FinFET Technology With Metal Coupling and Charge-Sharing Write-Assist Circuitry Schemes for High-Density and Low-VMIN Applications", IEEE Journal of Solid-State Circuits, vol. 56, No. 1, Jan. 2021, pp. 179-187.

Huang et al., "3-D Self-aligned Stacked NMOS-on-PMOS Nanoribbon Transistors for Continued Moore's Law Scaling", IEEE International Electron Devices Meeting (IEDM), 2020, pp. 20.6.1-20.6.4.

Kang et al., "Self-Aligned Coplanar a-IGZO TFTs and Application to High-Speed Circuits", IEEE Electron Device Letters, vol. 32, No. 10, Oct. 2011, pp. 1385-1387.

Li et al., "BEOL-Compatible High-Performance a-IGZO Transistors with Record high Ids, max = 1207 µA/µm and on-off ratio exceeding 1011 at Vds = 1V", IEEE International Electron Devices Meeting (IEDM), 2022, pp. 2.7.1-2.7.4.

(Continued)

*Primary Examiner* — Alfredo Bermudez Lozada
(74) *Attorney, Agent, or Firm* — Birch, Stewart, Kolasch & Birch, LLP (57) ABSTRACT

A memory device includes a memory array, a first reference voltage circuit, a first read voltage control circuit and a first write voltage control circuit. The first reference voltage circuit is configured to provide a first reference voltage signal having a first voltage level to the memory array. The first read voltage control circuit is configured to adjust the first reference voltage signal to a second voltage level when the memory array is read. The first write voltage control circuit is configured to adjust the first reference voltage signal to a third voltage level when the memory array is written. The second voltage level is higher than the first voltage level, and the third voltage level is lower than the first voltage level.

20 Claims, 8 Drawing Sheets

(56) References Cited

OTHER PUBLICATIONS

Rachmady et al., "300mm Heterogeneous 3D Integration of Record Performance Layer Transfer Germanium PMOS with Silicon NMOS for Low Power High Performance Logic Applications", IEEE International Electron Devices Meeting (IEDM), 2019, pp. 29.7.1-29.7.4.

* cited by examiner

MEMORY DEVICE ADJUSTING
REFERENCE VOLTAGE SIGNAL

BACKGROUND

A memory device is configured to store multiple data bits. When a memory cell column in the memory device performs write operations, the data bits are written into the memory cell column. When the memory cell column performs read operations, the data bits are read out from the memory cell column. Different voltage levels are required for the write operations and the read operations, to improve the performance of the memory device.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the provided subject matter. Specific examples of components, materials, values, steps, arrangements or the like are described below to simplify the present disclosure. These are, of course, merely examples and are not intended to be limiting. Other components, materials, values, steps, arrangements or the like are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The device may be otherwise oriented (rotated 90 degrees or at other orientations) and the spatially relative descriptors used herein may likewise be interpreted accordingly. The term mask, photolithographic mask, photomask and reticle are used to refer to the same item.

The terms applied throughout the following descriptions and claims generally have their ordinary meanings clearly established in the art or in the specific context where each term is used. Those of ordinary skill in the art will appreciate that a component or process may be referred to by different names. Numerous different embodiments detailed in this specification are illustrative only, and in no way limits the scope and spirit of the disclosure or of any exemplified term.

It is worth noting that the terms such as "first" and "second" used herein to describe various elements or processes aim to distinguish one element or process from another. However, the elements, processes and the sequences thereof should not be limited by these terms. For example, a first element could be termed as a second element, and a second element could be similarly termed as a first element without departing from the scope of the present disclosure.

In the following discussion and in the claims, the terms "comprising," "including," "containing," "having," "involving," and the like are to be understood to be open-ended, that is, to be construed as including but not limited to. As used herein, instead of being mutually exclusive, the term "and/or" includes any of the associated listed items and all combinations of one or more of the associated listed items.

Figure 1:
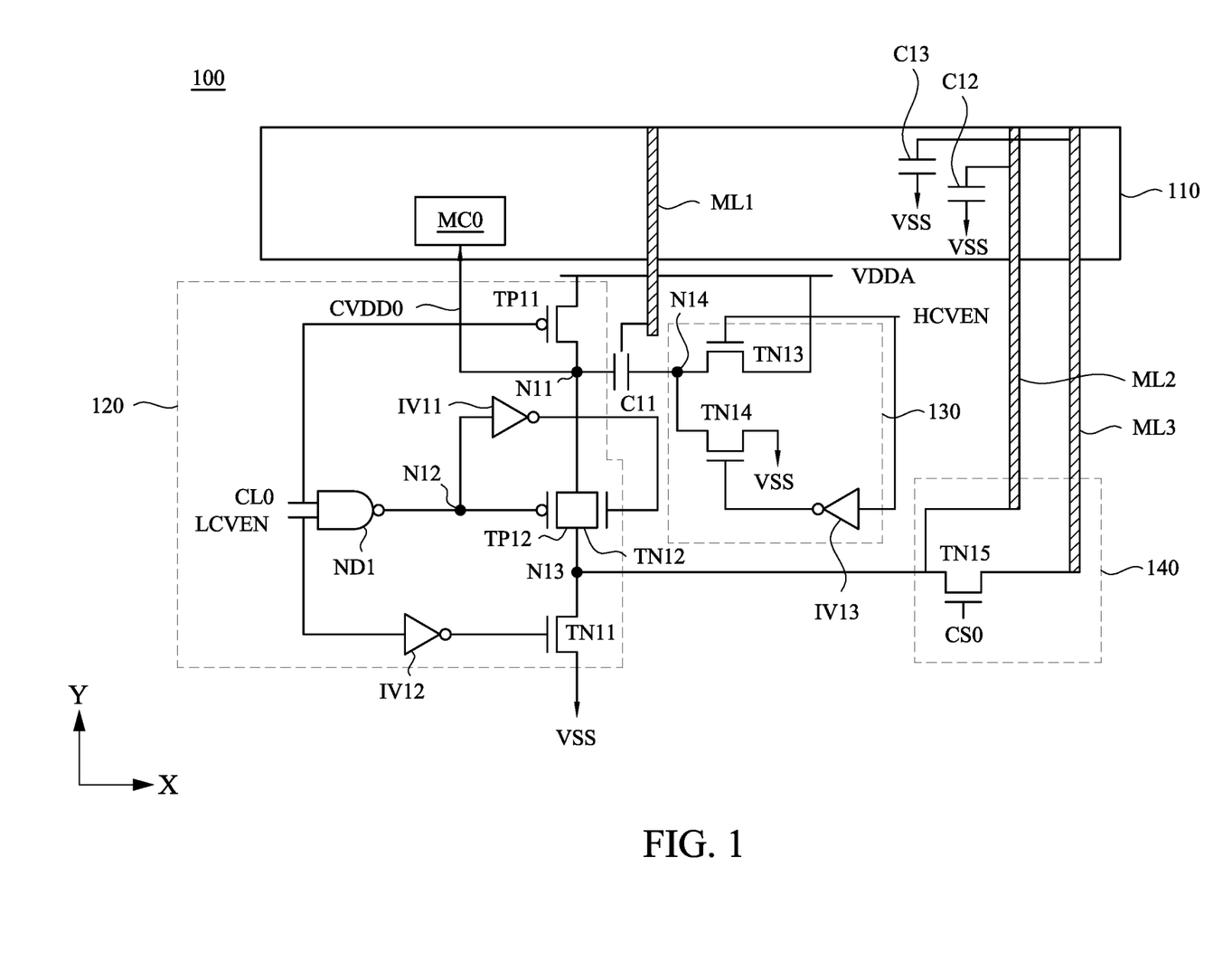
FIG. 1 is a schematic circuit diagram of a memory device, in accordance with some embodiments of the present disclosure.

FIG. 1 is a schematic circuit diagram of a memory device 100, in accordance with some embodiments of the present disclosure. In some embodiments, the memory device 100 is implemented by a static random-access memory (SRAM). As illustratively shown in FIG. 1, the memory device 100 includes a memory array 110, a reference voltage circuit 120, a read voltage control circuit 130, a write voltage control circuit 140 and capacitors C11-C13.

In some embodiments, the memory array 110 is configured to store data bits. The reference voltage circuit 120 is configured to provide a reference voltage signal CVDD0 from a node N11 to the memory array 110 according to a column select signal CL0 and an enable signal LCVEN, such that the memory array 110 performs read operations and write operations to the data bits according to the reference voltage signal CVDD0.

In some embodiments, the read voltage control circuit 130 is configured to adjust the reference voltage signal CVDD0 in response to the read operations, and the write voltage control circuit 140 is configured to adjust the reference voltage signal CVDD0 in response to the write operations. For example, the read voltage control circuit 130 increases a voltage level of the reference voltage signal CVDD0 when the memory array 110 is read, and the write voltage control circuit 140 decreases the voltage level of the reference voltage signal CVDD0 when the memory array 110 is written.

As illustratively shown in FIG. 1, the memory array 110 includes a memory cell column MC0. The memory cell column MC0 is coupled to the node N11. The reference voltage circuit 120 includes a NAND logic gate ND1, inverters IV11, IV12 and switches TP11, TP12, TN11 and TN12. A first input terminal of the NAND logic gate ND1 is configured to receive the column select signal CL0, a second input terminal of the NAND logic gate ND1 is configured to receive the enable signal LCVEN, and an output terminal of the NAND logic gate ND1 is coupled to a node N12. An input terminal of the inverter IV11 is coupled to the node N12, and an output terminal of the inverter IV11 is coupled to a control terminal of the switch TN12. An input terminal of the inverter IV12 is configured to receive the enable signal LCVEN, and an output terminal of the inverter IV12 is coupled to a control terminal of the switch TN11.

In some embodiments, a logic value of the column select signal CL0 indicates that whether the memory cell column MC0 is activated for the read operations and the write operations. When the memory cell column MC0 performs the read operations or the write operations, the column select signal CL0 has a logic value of 1. When the memory cell column MC0 does not perform the read operations or the write operations, the column select signal CL0 has a logic value of 0.

As illustratively shown in FIG. 1, a control terminal of the switch TP11 is configured to receive a column select signal CL0, a first terminal of the switch TP11 is configured to receive a reference voltage signal VDDA, and a second terminal of the switch TP11 is coupled to the node N11. A first terminal of the switch TP12 is coupled to the node N11, and a second terminal of the switch TP12 is coupled to a node N13. A first terminal of the switch TN11 is coupled to the node N13, and a second terminal of the switch TN11 is configured to receive a reference voltage signal VSS. A first terminal of the switch TN12 is coupled to the node N11, and a second terminal of the switch TN12 is coupled to the node N13. In some embodiments, the switches TP12 and TN12 are configured to operate as a transmission gate between the nodes N11 and N13.

As illustratively shown in FIG. 1, the read voltage control circuit 130 includes switches TN13, TN14 and an inverter IV13. A first terminal of the switch TN13 is coupled to a node N14, a second terminal of the switch TN13 is configured to receive the reference voltage signal VDDA, and a control terminal of the switch TN13 is configured to receive an enable signal HCVEN. A first terminal of the switch TN14 is coupled to the node N14, a second terminal of the switch TN14 is configured to receive the reference voltage signal VSS, and a control terminal of the switch TN14 is coupled to an output terminal of the inverter IV13. An input terminal of the inverter IV13 is configured to receive an enable signal HCVEN.

As illustratively shown in FIG. 1, a first terminal of the capacitor C11 is coupled to the node N11, and a second terminal of the capacitor C11 is coupled to the node N14. In some embodiments, the read voltage control circuit 130 is configured to adjust the node N11 through the capacitor C11 by capacitive coupling.

As illustratively shown in FIG. 1, the write voltage control circuit 140 includes a switch TN15. A first terminal of the switch TN15 is coupled to the node N13, a second terminal of the switch TN15 is coupled to a first terminal of the capacitor C13, and a control terminal of the switch TN15 is configured to receive a control signal CS0. A second terminal of the capacitor C13 is configured to receive the reference voltage signal VSS. A first terminal of the capacitor C12 is coupled to the node N13, and a second terminal of the capacitor C12 is configured to receive the reference voltage signal VSS. In some embodiments, a voltage level of the reference voltage signal VDDA is higher than the reference voltage signal VSS.

In some embodiments, the switches TP11 and TP12 are implemented by transistors of a first conductive type, and the switches TN11-TN15 are implemented by transistors of a second conductive type different from the first conductive type. For example, the switches TP11 and TP12 are implemented by P-type metal-oxide-semiconductor (PMOS) transistors, and the switches TN11-TN15 are implemented by N-type metal-oxide-semiconductor (NMOS) transistors.

In some embodiments, the capacitors C11-C13 are implemented by conductive segments ML1-ML3, respectively. Each of the conductive segments ML1-ML3 extends along a Y direction. The conductive segments ML1-ML3 are arranged in order along an X direction. The Y direction and the X direction are perpendicular with each other in some embodiments. The capacitances of the capacitors C11-C13 are increased when the lengths of the conductive segments ML1-ML3 are increased. In some embodiments, along the Y direction, when a length of the memory array 110 is increased, lengths of the conductive segments ML1-ML3 are increased. Accordingly, the capacitances of the capacitors C11-C13 are adaptive for various lengths of the memory array 110.

In some embodiments, each of the conductive segments ML1-ML3 includes two conductive tracks, such as metal tracks. In some embodiments, a first conductive track of the conductive segment ML1 is coupled to the node N11, and a second conductive track of the conductive segment ML1 is coupled to the node N14. A first conductive track of the conductive segment ML2 is coupled to the node N13, and a second conductive track of the conductive segment ML2 is configured to receive the reference voltage signal VSS. A first conductive track of the conductive segment ML3 is coupled to the switch TN15, and a second conductive track of the conductive segment ML3 is configured to receive the reference voltage signal VSS. In some embodiments, each of the capacitors C11-C13 further includes dielectric materials between the two conductive tracks.

Figure 2:
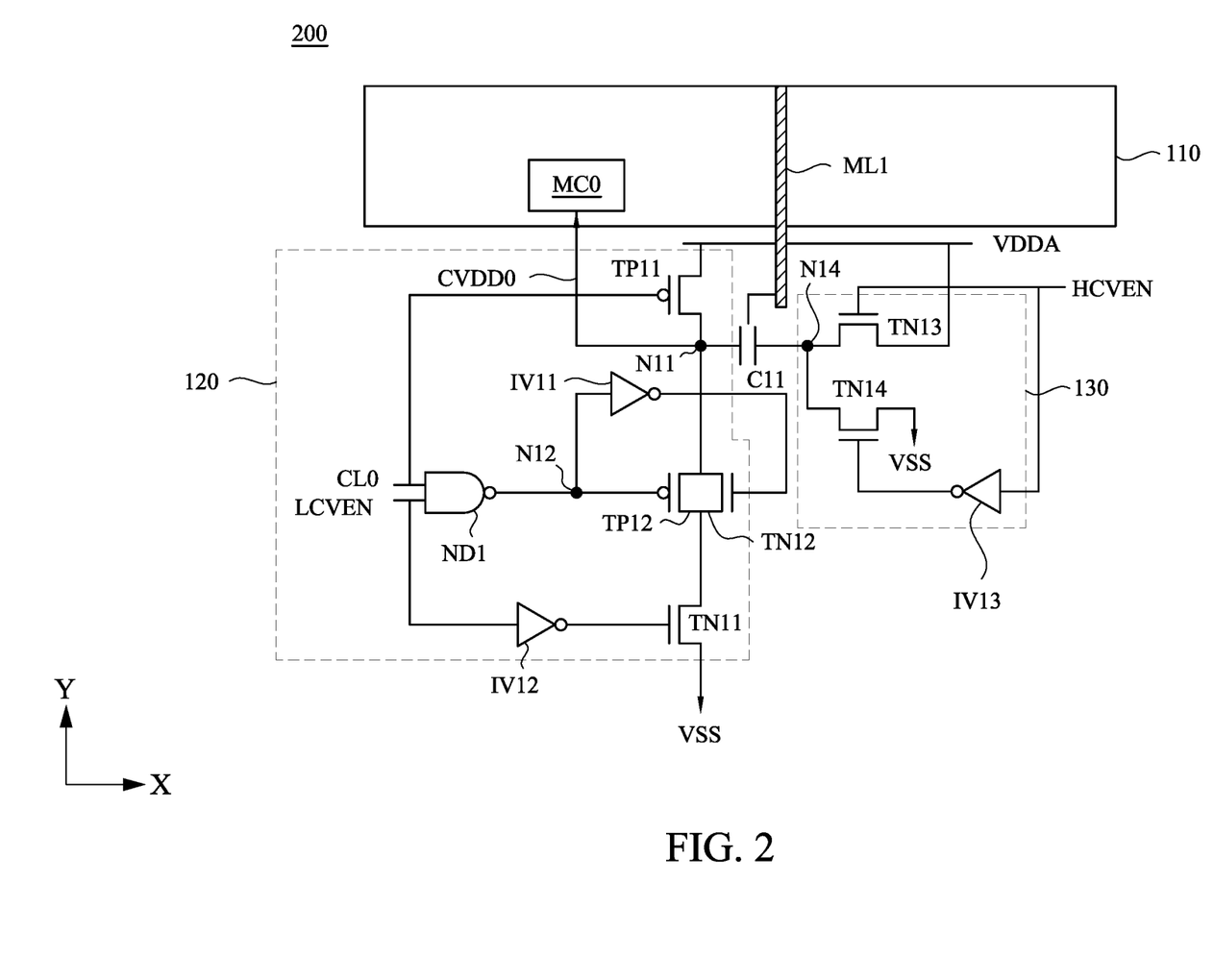
FIG. 2 is a schematic circuit diagram of a memory device corresponding to the memory device shown in FIG. 1, in accordance with some embodiments of the present disclosure.

FIG. 2 is a schematic circuit diagram of a memory device 200 corresponding to the memory device 100 shown in FIG. 1, in accordance with some embodiments of the present disclosure. Referring to FIG. 1 and FIG. 2, the memory device 200 is an alternative embodiment of the memory device 100. FIG. 2 follows a similar labeling convention to that of FIG. 1. For brevity, the discussion will focus more on differences between FIG. 2 and FIG. 1 than on similarities.

Referring to FIG. 1 and FIG. 2, compared to the memory device 100, the memory device 200 does not include the write voltage control circuit 140 and the capacitors C12, C13. In some alternative embodiments, the memory device 200 includes a part or all of the write voltage control circuit 140 and the capacitors C12, C13.

Figure 3:
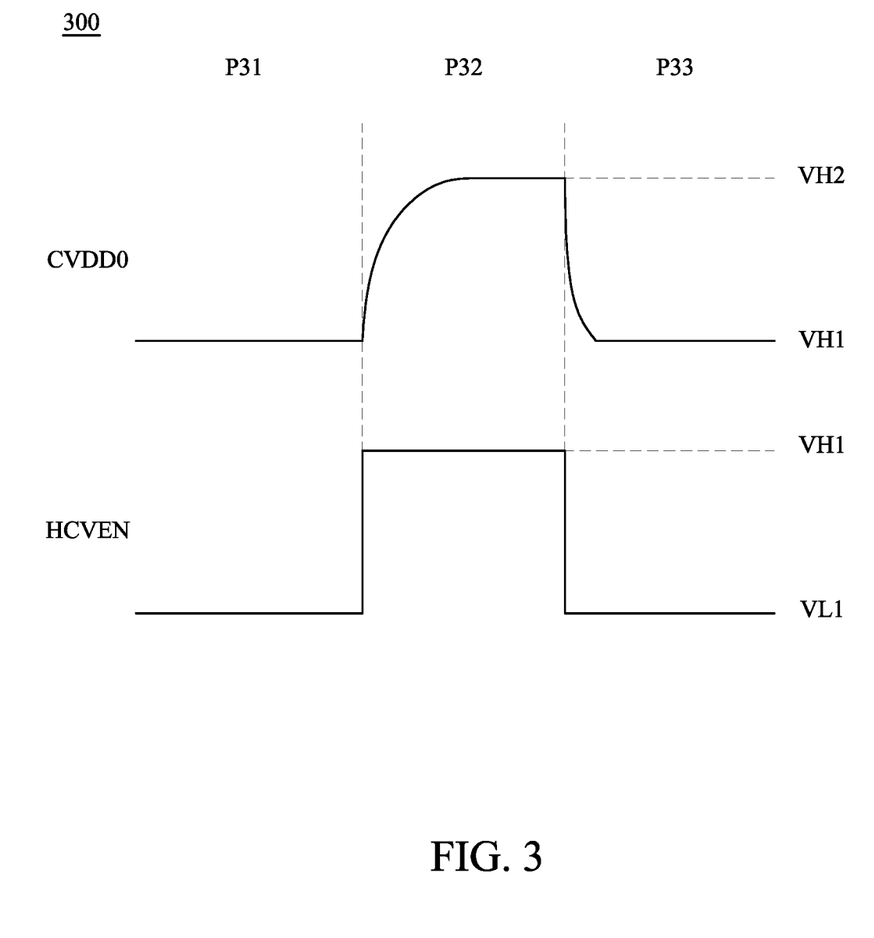
FIG. 3 is a timing diagram of the signals associated with the memory device shown in FIG. 2, in accordance with some embodiments of the present disclosure.

FIG. 3 is a timing diagram 300 of the signals associated with the memory device 200 shown in FIG. 2, in accordance with some embodiments of the present disclosure. As illustratively shown in FIG. 3, the timing diagram 300 includes periods P31-P33 arranged continuously in order.

During the periods P31-P33, the enable signal HCVEN is operated between the voltage levels VL1 and VH1, which correspond to the logic values of 0 and 1, respectively. In some embodiments, the voltage level VL1 is an enable voltage level of the switches TP11 and TP12, and is a disable voltage level of the switches TN11-TN15. The voltage level VH1 is an enable voltage level of the switches TN11-TN15, and is a disable voltage level of the switches TP11 and TP12. Alternatively stated, the switches TP11 and TP12 are turned on in response to the voltage level VL1, and are turned off in response to the voltage level VH1. The switches TN11-TN15 are turned on in response to the voltage level VH1, and are turned off in response to the voltage level VL1. In some embodiments, the voltage level VH1 is higher than the voltage level VL1. In some embodiments, the reference voltage signal VDDA has the voltage level VH1 during the periods P31-P33.

During the period P31, the enable signal HCVEN has the voltage level VL1, such that the switch TN13 is turned off and the switch TN14 is turned on to provide the reference voltage signal VSS to the node N14, to discharge the node N14. Each of the enable signal LCVEN and the column select signal CL0 has a logic value of 0 (for example, having the voltage level VL1), such that the node N12 has a logic value of 1 to turn off the switches TP12 and TN12, and the switch TP11 is turned on to provide the reference voltage signal VDDA to the node N11. Accordingly, the reference voltage signal CVDD0 has the voltage level VH1 of the reference voltage signal VDDA.

During the period P32, in response to the memory cell column MC0 performing a read operation, the enable signal HCVEN has the voltage level VH1, such that the switch TN14 is turned off and the switch TN13 is turned on to provide the reference voltage signal VDDA to the node N14. The column select signal CL0 has the logic value of 1 (for example, having the voltage level VH1), such that the switch TP11 is turned off. The enable signal LCVEN is maintained at the logic value of 0, such that the node N12 is maintained at the logic value of 1, and the switches TP12 and TN12 are turned off. At this moment, the node N14 is pulled high from the voltage level VL1 to the voltage level VH1, such that the capacitor C11 pulls high the node N11 from the voltage level VH1 to the voltage level VH2 through capacitive coupling.

During the period P33, in response to the memory cell column MC0 terminating the read operation, the enable signal HCVEN has the voltage level VL1 to provide the reference voltage signal VSS to the node N14. The column select signal CL0 has the logic value of 0, such that the switch TP11 is turned on to provide the reference voltage signal VDDA to the node N11. Accordingly, the reference voltage signal CVDD0 has the voltage level VH1.

In some approaches, during a read operation of a memory cell column, a reference voltage signal provided memory cell column is not adjusted. As a result, a speed of the read operation is slow.

Compared to the above approaches, in some embodiments of the present disclosure, the read voltage control circuit 130 pulls high the reference voltage signal CVDD0 to the voltage level VH2 in response to the read operation during the period P32. As a result, a speed of the read operation is improved.

Figure 4:
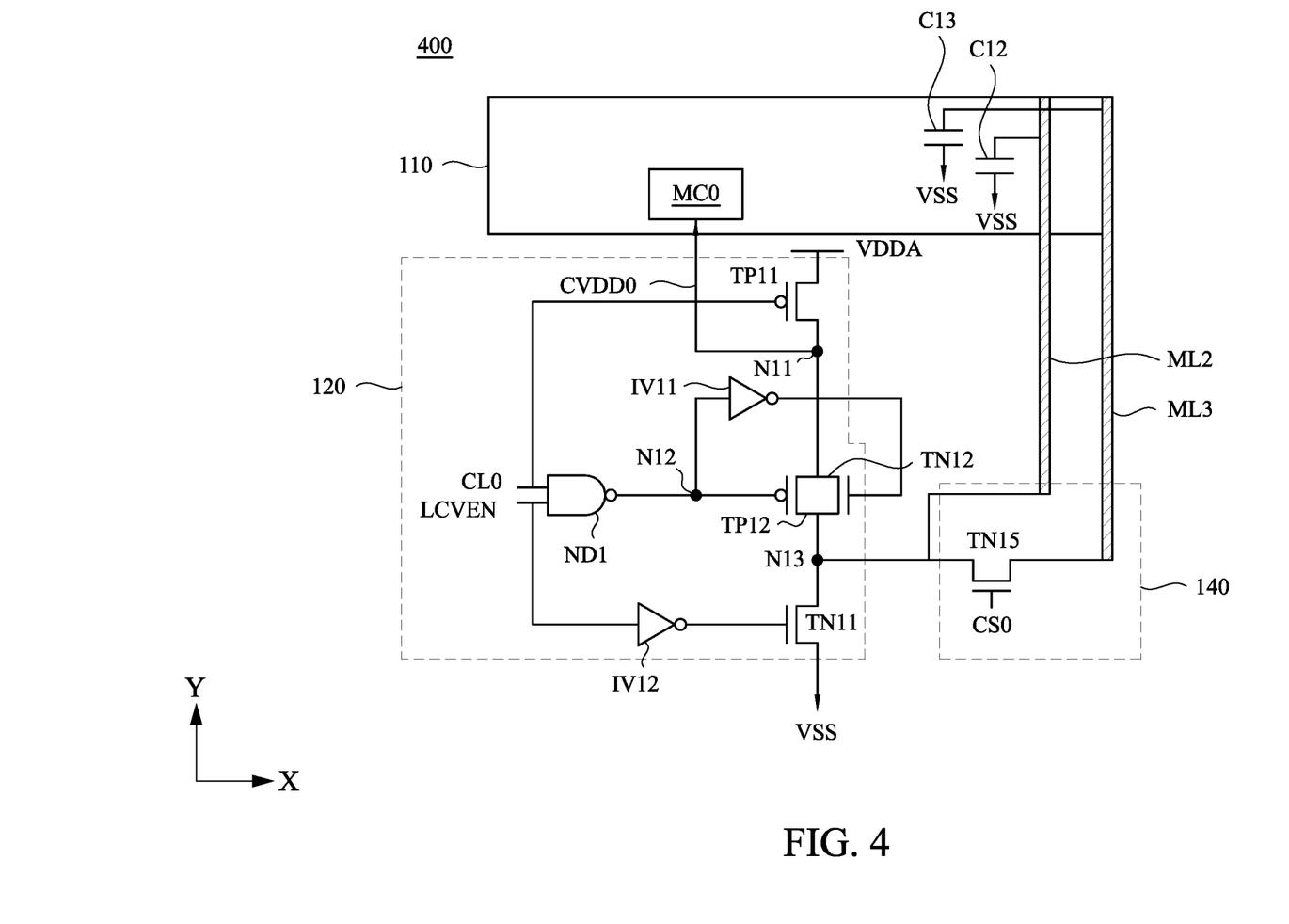
FIG. 4 is a schematic circuit diagram of a memory device corresponding to the memory device shown in FIG. 1, in accordance with some embodiments of the present disclosure.

FIG. 4 is a schematic circuit diagram of a memory device 400 corresponding to the memory device 100 shown in FIG. 1, in accordance with some embodiments of the present disclosure. Referring to FIG. 1 and FIG. 4, the memory device 400 is an alternative embodiment of the memory device 100. FIG. 4 follows a similar labeling convention to that of FIG. 1. For brevity, the discussion will focus more on differences between FIG. 4 and FIG. 1 than on similarities.

Referring to FIG. 1 and FIG. 4, compared to the memory device 100, the memory device 400 does not include the read voltage control circuit 130 and the capacitor C11. In some alternative embodiments, the memory device 400 includes a part or all of the read voltage control circuit 130 and the capacitor C11.

Figure 5:
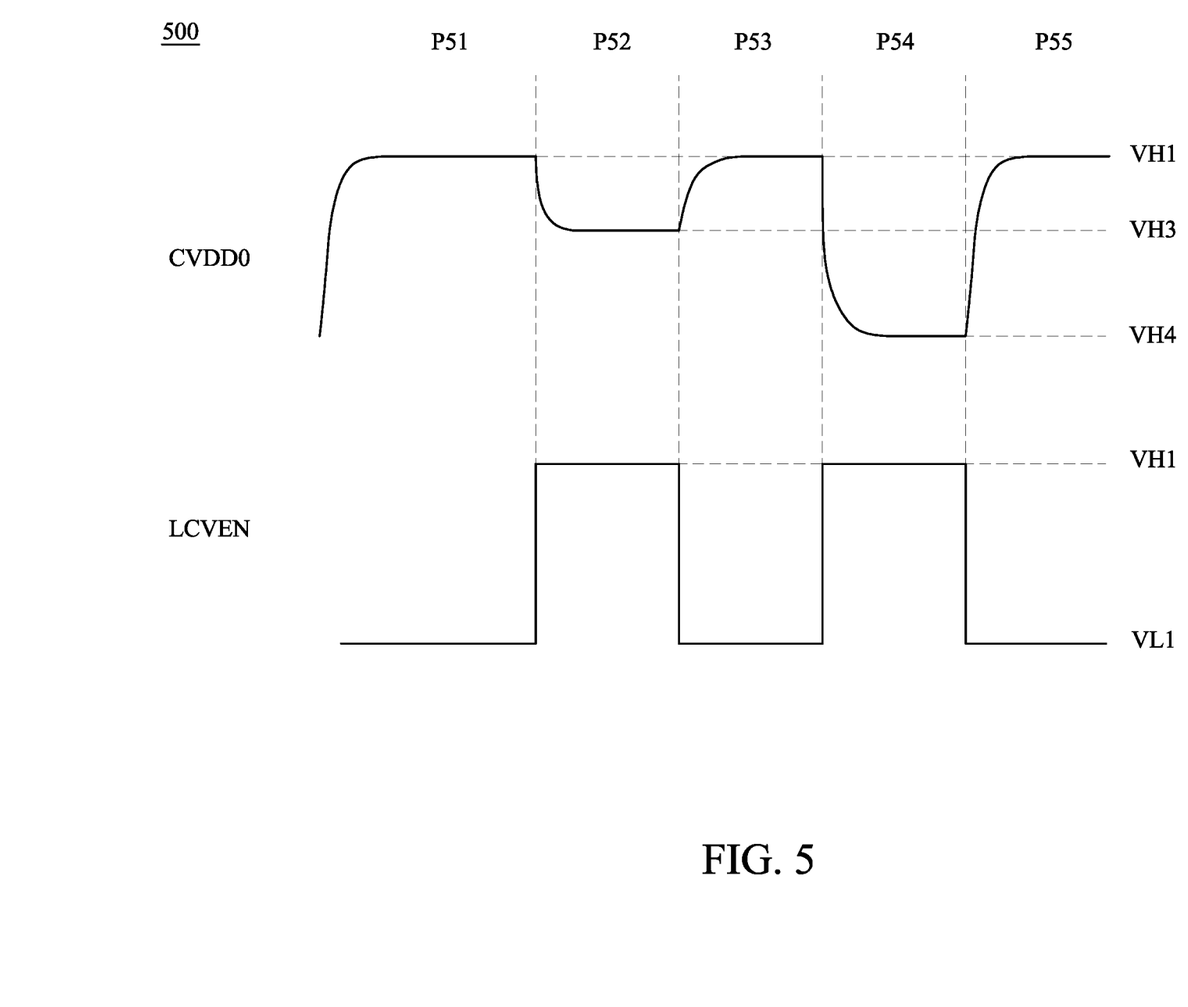
FIG. 5 is a timing diagram of the signals associated with the memory device shown in FIG. 4, in accordance with some embodiments of the present disclosure.

FIG. 5 is a timing diagram 500 of the signals associated with the memory device 400 shown in FIG. 4, in accordance with some embodiments of the present disclosure. As illustratively shown in FIG. 5, the timing diagram 500 includes periods P51-P55 arranged continuously in order.

During the period P51, the enable signal LCVEN has the voltage level VL1 (which corresponds to the logic value of 0), such that the node N12 has the logic value of 1, to turn off each of the switches TP12 and TN12. The column select signal CL0 has the logic value of 0, such that the switch TP11 is turned on to provide the reference voltage signal VDDA to the node N11. Accordingly, the reference voltage signal CVDD0 has the voltage level VH1 of the reference voltage signal VDDA.

During the period P52, in response to a first write operation of the memory cell column MC0, each of the column select signal CL0 and the enable signal LCVEN has the voltage level VH1 (which corresponds to the logic value of 1), such that the node N12 has the logic value of 0, to turn on each of the switches TP12 and TN12. The column select signal CL0 has the logic value of 1, such that the switch TP11 is turned off. At this moment, the control signal CS0 has the logic value of 0 to turn off the switch TN15, such that charges of the node N11 is shared with the capacitor C12 through the switches TP12 and TN12, and the capacitor C13 is isolated from the node N11. Accordingly, the reference voltage signal CVDD0 is pulled low to a voltage level VH3, which is lower than the voltage level VH1, by the capacitor C12.

During the period P53, in response to the first write operation terminated, the enable signal LCVEN has the voltage level VL1, such that the node N12 has the logic value of 1, to turn off each of the switches TP12 and TN12. The column select signal CL0 has the logic value of 0, such that the switch TP11 is turned on to provide the reference voltage signal VDDA to the node N11. Accordingly, the reference voltage signal CVDD0 has the voltage level VH1.

During the period P54, in response to a second write operation of the memory cell column MC0, each of the column select signal CL0 and the enable signal LCVEN has the voltage level VH1, such that the node N12 has the logic value of 0, to turn on each of the switches TP12 and TN12. The column select signal CL0 has the logic value of 1, such that the switch TP11 is turned off. At this moment, the control signal CS0 has the logic value of 1 to turn on the switch TN15, such that the charges of the node N11 is shared with the capacitors C12 and C13 through the switches TP12 and TN12. Accordingly, the reference voltage signal CVDD0 is pulled low to a voltage level VH4, which is lower than the voltage level VH3, by the capacitors C12 and C13.

During the period P55, in response to the second write operation terminated, the enable signal LCVEN has the voltage level VL1, such that the node N12 has the logic value of 1, to turn off each of the switches TP12 and TN12. The column select signal CL0 has the logic value of 0, such that the switch TP11 is turned on to provide the reference voltage signal VDDA to the node N11. Accordingly, the reference voltage signal CVDD0 has the voltage level VH1.

In some embodiments, the first write operation corresponds to a first operation mode of the voltage level VH1 having a first voltage value (such as the voltage value VV1 shown in FIG. 6B), and the second write operation corresponds to a second operation mode of the voltage level VH1 having a second voltage value (such as the voltage value VV2 shown in FIG. 6B), in which the second voltage value is higher than the first voltage value. Accordingly, the memory device 400 pulls low the reference voltage signal CVDD0 to the voltage level VH3 by one capacitor C12 in the first operation mode, and pulls low the reference voltage signal CVDD0 to the voltage level VH4 by two capacitors C12 and C13 in the second operation mode.

In some embodiments, operations of the periods P51-P53 correspond to the first operation mode, and the operations of the periods P53-P55 correspond to the second operation mode. In various operation modes, when the voltage level VH1 is higher, more capacitors are required to share the charges of the node N11, to reduce the voltage level of the reference voltage signal CVDD0 to a write minimum operating voltage value (such as the write minimum operating voltage value VWM shown in FIG. 6B).

In various embodiments, the write voltage control circuit 140 pulls low the reference voltage signal CVDD0 by various numbers of capacitors. Further details of such embodiments are described below with FIG. 6A and FIG. 6B.

In some approaches, during a write operation, a quantity of capacitors for pulling low a reference voltage signal of a memory cell column is not adjustable. As a result, the reference voltage signal cannot trace a write minimum operating voltage value for operation modes of different voltage values.

Compared to the above approaches, in some embodiments of the present disclosure, a quantity of capacitors for pulling low the reference voltage signal CVDD0 is adjustable by at least the switch TN15. As a result, the reference voltage signal CVDD0 traces the write minimum operating voltage value for operation modes of different voltage values of the voltage level VH1.

Referring to FIG. 1 to FIG. 5, the memory device 100 operates according to timing diagrams 300 and 500 in some embodiments. Accordingly, the memory device 100 pulls high the reference voltage signal CVDD0 by the operations corresponding to the timing diagram 300 in response to the read operations, and pulls low the reference voltage signal CVDD0 by the operations corresponding to the timing diagram 500 in response to the write operations.

Figure 6A:
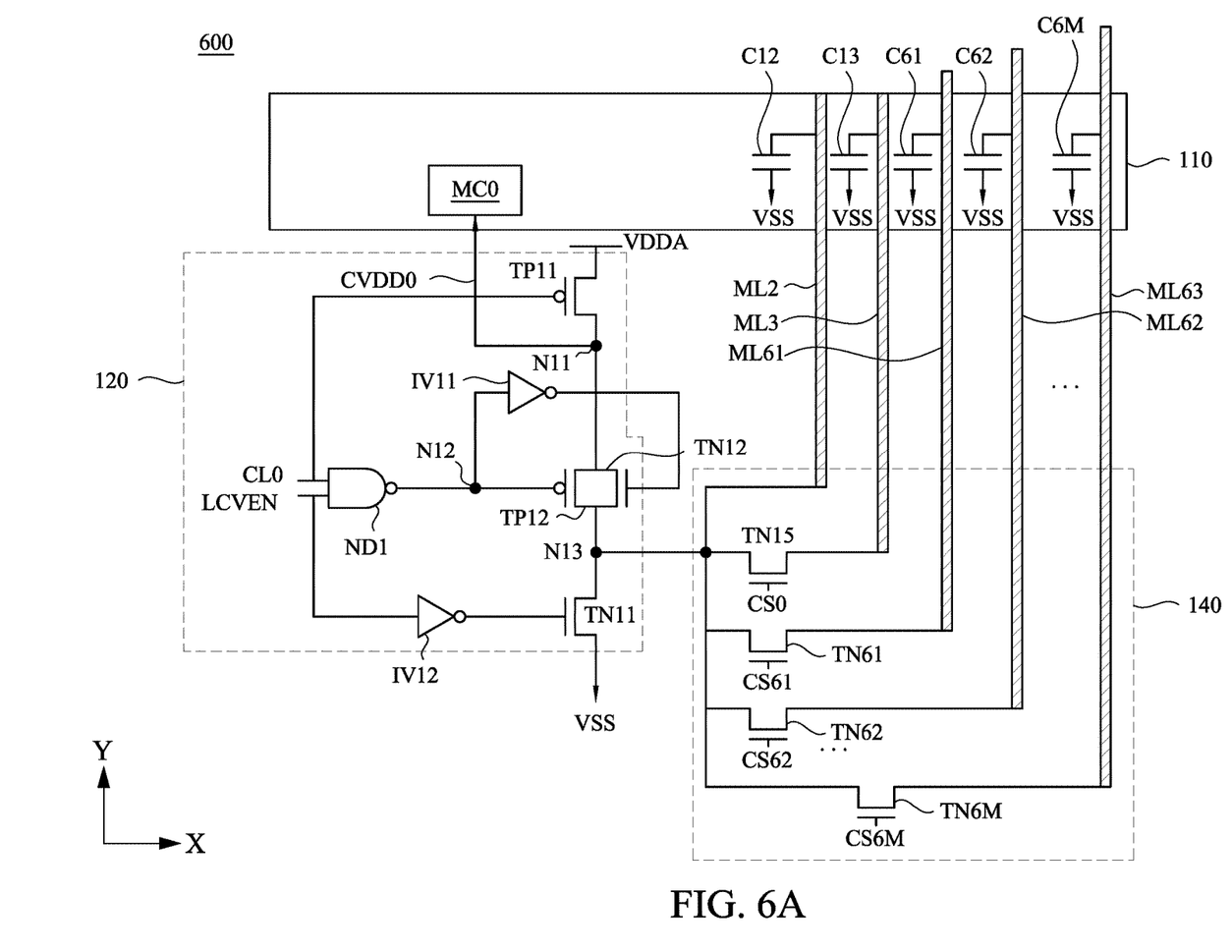
FIG. 6A is a schematic circuit diagram of a memory device corresponding to the memory device shown in FIG. 4, in accordance with some embodiments of the present disclosure.

FIG. 6A is a schematic circuit diagram of a memory device 600 corresponding to the memory device 400 shown in FIG. 4, in accordance with some embodiments of the present disclosure. Referring to FIG. 6A and FIG. 4, the memory device 600 is an alternative embodiment of the memory device 400. FIG. 6A follows a similar labeling convention to that of FIG. 4. For brevity, the discussion will focus more on differences between FIG. 6A and FIG. 4 than on similarities.

Referring to FIG. 6A and FIG. 4, compared to the memory device 400, the memory device 600 further includes capacitors C61-C6M, and the write voltage control circuit 140 further includes switches TN61-TN6M, for M being a positive integer.

As illustratively shown in FIG. 6A, each of first terminals of the switches TN61-TN6M is coupled to the node N13. Second terminals of the switches TN61-TN6M are coupled to first terminals of the capacitors C61-C6M, respectively. Each of second terminals of the capacitors C61-C6M is configured to receive the reference voltage signal VSS. Control terminals of the switches TN61-TN6M are configured to receive control signals CS61-CS6M, respectively. In some embodiments, when one or more of the control signals CS61-CS6M has the logic value of 0, the corresponding one or more of the switches TN61-TN6M is turned off. When one or more of the control signals CS61-CS6M has the logic value of 1, the corresponding one or more of the switches TN61-TN6M is turned on.

In some embodiments, the capacitors C61-C6M are implemented by conductive segments ML61-ML6M, respectively. Each of the conductive segments ML61-ML6M extends along the Y direction. The capacitances of the capacitors C61-C6M are increased when the lengths of the conductive segments ML61-ML6M are increased. In some embodiments, along the Y direction, when a length of the memory array 110 is increased, lengths of the conductive segments ML61-ML6M are increased. Accordingly, the capacitances of the capacitors C61-C6M are adaptive for various lengths of the memory array 110.

In some embodiments, each of the conductive segments ML61-ML6M includes two conductive tracks, such as metal tracks. In some embodiments, first conductive tracks of the conductive segments ML61-ML6M are coupled to the corresponding switches TN61-TN6M. Second conductive tracks of the conductive segments ML61-ML6M are configured to receive the reference voltage signal VSS. In some embodiments, each of the capacitors C61-C6M further includes dielectric materials between the two conductive tracks.

In some embodiments, when the voltage level VH1 of the reference voltage signal VDDA is increased, a quantity of the control signals CS0 and CS61-CS6M having the logic value of 1 is increased, to increase a quantity of the switches TN15 and TN61-TN6M being turned on. Accordingly, the node N11 shares charges with corresponding one or more of the capacitors C13 and C61-C6M, to pull low the reference voltage signal CVDD0. On the other hand, when the voltage level VH1 of the reference voltage signal VDDA is decreased, a quantity of the switches TN15 and TN61-TN6M being turned off is increased, such that a quantity of the corresponding one or more of the capacitors C13 and C61-C6M isolated from the node N11 is increased.

Figure 6B:
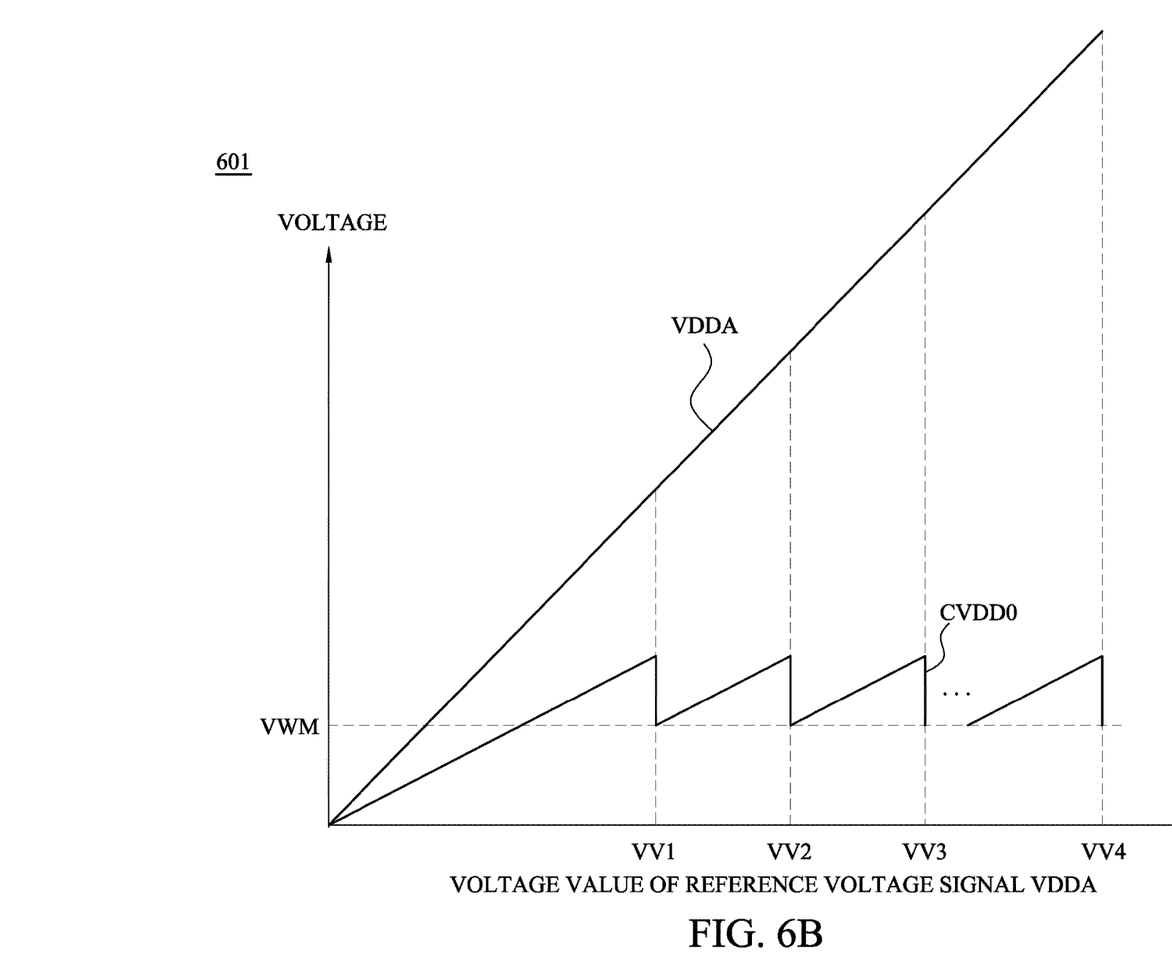
FIG. 6B is a schematic diagram of the reference voltage signals of the memory device shown in FIG. 6A, in accordance with some embodiments of the present disclosure.

FIG. 6B is a schematic diagram 601 of the reference voltage signals VDDA and CVDD0 of the memory device 600 shown in FIG. 6A, in accordance with some embodiments of the present disclosure. A horizontal axis of the schematic diagram 601 corresponds to voltage values of the voltage level VH1 of the reference voltage signal VDDA. A vertical axis of the schematic diagram 601 corresponds to voltage levels.

As illustratively shown in FIG. 6B, the voltage level of the reference voltage signal CVDD0 is increased when the voltage value of the reference voltage signal VDDA is increased. Referring to FIG. 6A and FIG. 6B, when the voltage value of the reference voltage signal VDDA is increased, the quantity of the control signals CS0 and CS61-CS6M having the logic value of 1 is increased, to increase the quantity of the switches TN15 and TN61-TN6M being turned on, such that the reference voltage signal CVDD0 traces the write minimum operating voltage value VWM for different voltage values of the reference voltage signal VDDA.

For example, when a voltage value of the reference voltage signal VDDA is smaller than a voltage value VV1, the control signals CS0 and CS61-CS6M have the logic value of 0 to turn off the switches TN15 and TN61-TN6M, such that node N11 share charges with the capacitor C12. When the reference voltage signal VDDA has the voltage value VV1, the control signal CS0 has the logic value of 1 to turn on the switch TN15, such that node N11 share charges with the capacitors C12 and C13. Accordingly, the reference voltage signal CVDD0 is pulled low by the capacitors C12 and C13, to approach the write minimum operating voltage value VWM.

Similarly, when the reference voltage signal VDDA has the voltage value VV2, the control signals CS0 and CS61 have the logic value of 1 to turn on the switches TN15 and TN61, such that node N11 share charges with the capacitors C12, C13 and C61. Accordingly, the reference voltage signal CVDD0 is pulled low by the capacitors C12, C13 and C61, to approach the write minimum operating voltage value VWM. When the reference voltage signal VDDA has the voltage value VV3, the control signals CS0, CS61 and CS62 have the logic value of 1 to turn on the switches TN15, TN61 and TN62, such that node N11 share charges with the capacitors C12, C13, C61 and C62. Accordingly, the reference voltage signal CVDD0 is pulled low by the capacitors C12, C13, C61 and C62, to approach the write minimum operating voltage value VWM, and so on.

Eventually, when the reference voltage signal VDDA has the voltage value VV4, the control signals CS0 and CS61-CS6M have the logic value of 1 to turn on the switches TN15, TN61-TN6M, such that node N11 share charges with the capacitors C12, C13, C61-C6M. Accordingly, the reference voltage signal CVDD0 is pulled low by the capacitors C12, C13 and C61-C6M, to approach the write minimum operating voltage value VWM.

In summary, the logic values of the control signals CS0 and CS61-CS6M are controlled (for example, controlled by a processor not shown in the figures) according to a voltage value of the reference voltage signal VDDA, such that the reference voltage signal CVDD is pulled low correspondingly to trace the write minimum operating voltage value VWM.

Figure 7:
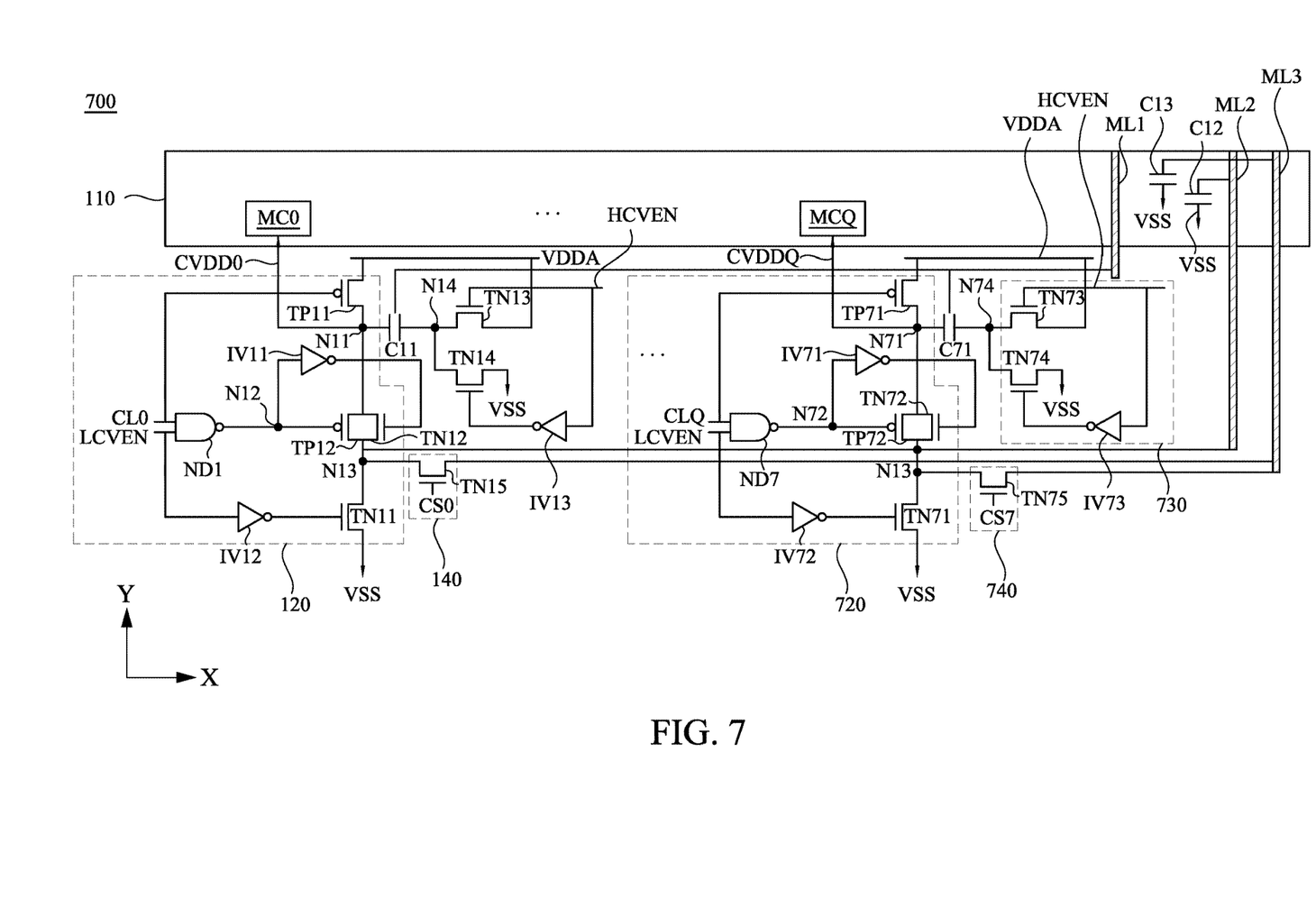
FIG. 7 is a schematic circuit diagram of a memory device corresponding to the memory device shown in FIG. 1, in accordance with some embodiments of the present disclosure.

FIG. 7 is a schematic circuit diagram of a memory device 700 corresponding to the memory device 100 shown in FIG. 1, in accordance with some embodiments of the present disclosure. Referring to FIG. 7 and FIG. 1, the memory device 700 is an alternative embodiment of the memory device 100. FIG. 7 follows a similar labeling convention to that of FIG. 1. For brevity, the discussion will focus more on differences between FIG. 7 and FIG. 1 than on similarities.

Referring to FIG. 7 and FIG. 1, compared to the memory device 100, the memory device 700 further includes a reference voltage circuit 720, a read voltage control circuit 730 and a write voltage control circuit 740, the memory array 110 further includes memory cell column MC1-MCQ, for Q being a positive integer.

In some embodiments, the reference voltage circuit 720 is configured to provide a reference voltage signal CVDDQ from a node N71 to the memory cell column MCQ according to a column select signal CLQ and the enable signal LCVEN, such that the memory cell column MCQ performs read operations and write operations according to the reference voltage signal CVDDQ.

In some embodiments, the read voltage control circuit 730 is configured to adjust the reference voltage signal CVDDQ in response to the read operations of the memory cell column MCQ, and the write voltage control circuit 740 is configured to adjust the reference voltage signal CVDDQ in response to the write operations the memory cell column MCQ. For example, the read voltage control circuit 730 increases a voltage level of the reference voltage signal CVDDQ when the memory cell column MCQ is read, and the write voltage control circuit 740 decreases the voltage level of the reference voltage signal CVDDQ when the memory cell column MCQ is written.

As illustratively shown in FIG. 7, the reference voltage circuit 720 includes a NAND logic gate ND7, inverters IV71, IV72 and switches TP71, TP72, TN71 and TN72. A first input terminal of the NAND logic gate ND7 is configured to receive the column select signal CLQ, a second input terminal of the NAND logic gate ND7 is configured to receive the enable signal LCVEN, and an output terminal of the NAND logic gate ND7 is coupled to a node N72. An input terminal of the inverter IV71 is coupled to the node N72, and an output terminal of the inverter IV71 is coupled to a control terminal of the switch TN72. An input terminal of the inverter IV72 is configured to receive the enable signal LCVEN, and an output terminal of the inverter IV72 is coupled to a control terminal of the switch TN71. In some embodiments, a logic value of the column select signal CLQ indicates that whether the memory cell column MCQ is activated for the read operations and the write operations.

As illustratively shown in FIG. 7, a control terminal of the switch TP71 is configured to receive a column select signal CLQ, a first terminal of the switch TP71 is configured to receive the reference voltage signal VDDA, and a second terminal of the switch TP71 is coupled to the node N71. A first terminal of the switch TP72 is coupled to the node N71, and a second terminal of the switch TP72 is coupled to the node N13. A first terminal of the switch TN71 is coupled to the node N13, and a second terminal of the switch TN71 is configured to receive a reference voltage signal VSS. A first terminal of the switch TN72 is coupled to the node N71, and a second terminal of the switch TN72 is coupled to the node N13. In some embodiments, the switches TP72 and TN72 are configured to operate as a transmission gate between the nodes N71 and N13.

As illustratively shown in FIG. 7, the read voltage control circuit 130 includes switches TN73, TN74 and an inverter IV73. A first terminal of the switch TN73 is coupled to a node N74, a second terminal of the switch TN73 is configured to receive the reference voltage signal VDDA, and a control terminal of the switch TN73 is configured to receive the enable signal HCVEN. A first terminal of the switch TN74 is coupled to the node N74, a second terminal of the switch TN74 is configured to receive the reference voltage signal VSS, and a control terminal of the switch TN74 is coupled to an output terminal of the inverter IV73. An input terminal of the inverter IV73 is configured to receive the enable signal HCVEN.

As illustratively shown in FIG. 7, a first terminal of the capacitor C71 is coupled to the node N71, and a second terminal of the capacitor C71 is coupled to the node N74. In some embodiments, the read voltage control circuit 730 is configured to adjust the node N74 through the capacitor C71 by capacitive coupling.

As illustratively shown in FIG. 7, the write voltage control circuit 740 includes a switch TN75. A first terminal of the switch TN75 is coupled to the node N13, a second terminal of the switch TN75 is coupled to the first terminal of the capacitor C13, and a control terminal of the switch TN75 is configured to receive a control signal CS7.

In some embodiments, the switches TP71 and TP72 are implemented by transistors of the first conductive type, and the switches TN71-TN75 are implemented by transistors of the second conductive type. For example, the switches TP71 and TP72 are implemented by PMOS transistor and the switches TN71-TN75 are implemented by NMOS transistors.

In some embodiments, similar with the capacitor C11, the capacitor C71 is also implemented by the conductive segment ML1. For example, the first conductive track of the conductive segment ML1 is coupled to the node N71, and the second conductive track of the conductive segment ML1 is coupled to the node N74. Alternatively stated, the conductive segment ML1 is shared by the capacitor C11 and C71.

Referring to FIG. 7 and FIG. 3, in response to the read operations of the memory cell column MCQ, the reference voltage circuit 720 and the read voltage control circuit 730 operates according to the timing diagram 300 to pull high the reference voltage signal CVDDQ by capacitive coupling of the capacitor C71. Accordingly, a waveform of the reference voltage signal CVDDQ is similar with the waveform of the reference voltage signal CVDD0 shown in FIG. 3.

Referring to FIG. 7 and FIG. 5, in response to the write operations of the memory cell column MCQ, the reference voltage circuit 720 and the write voltage control circuit 740 operates according to the timing diagram 500 to pull low the reference voltage signal CVDDQ by capacitive coupling of at least one of the capacitors C12 and C13. Accordingly, a waveform of the reference voltage signal CVDDQ is similar with the waveform of the reference voltage signal CVDD0 shown in FIG. 5.

In some embodiments, when the reference voltage signal VDDA has the voltage value VV1, the control signal CS7 has the logic value of 0 to turn off the switch TN75, such that the charges of the node N71 is shared with the capacitor C12, and the reference voltage signal CVDDQ is pulled low to the voltage level VH3.

In other embodiments, when the reference voltage signal VDDA has the voltage value VV2, the control signal CS7 has the logic value of 1 to turn on the switch TN75, such that the charges of the node N71 is shared with the capacitors C12 and C13, and the reference voltage signal CVDDQ is pulled low to the voltage level VH4. As described above, the capacitors C12 and C13 pulls low the voltage levels of different reference voltage signals CVDD0 and CVDDQ in response to the write operations of the different memory cell columns MC0 and MCQ.

In some embodiments, the memory device further includes K-2 reference voltage circuits, K-2 read voltage control circuits and K-2 write voltage control circuits (not shown in the figures) coupled to the corresponding memory cell column MC1-MC(Q-1). Configurations and operations of those K-2 reference voltage circuits, K-2 read voltage control circuits and K-2 write voltage control circuits are similar with the configurations and the operations the reference voltage circuit 720, a read voltage control circuit 730 and a write voltage control circuit 740 described above. Therefore, some descriptions are not repeated for brevity.

Referring to FIG. 7 and FIG. 6A, in some alternative embodiments, the write voltage control circuit 740 has a configuration similar with the configuration of the write voltage control circuit 140 shown in FIG. 6A. In such embodiments, the write voltage control circuit 740 further includes M switches coupled between the node N13 and the capacitors C61-C6M, such that the node N71 shares charges with one or more of the capacitors C61-C6M.

Referring to FIG. 7, FIG. 6A and FIG. 1, in some embodiments, at least one of the switches TN13-TN14, TN61-TN6M and TN73-TN75 is implemented by back-end-of-line (BEOL) compatible transistors, such that the area is not increased. In various embodiments, the at least one of the switches TN13-TN14, TN61-TN6M and TN73-TN75 is implemented by front-end-of-line (FEOL) transistors and/or stacking transistors. At least one of the capacitors C11-C13, C61-C6M is implemented by charge-sharing metal tracks, metal-oxide-semiconductor (MOS) capacitors, ferroelectric MOS capacitors and/or metal-insulator-metal capacitors.

Also disclosed is a memory device. The memory device includes a memory array, a first reference voltage circuit, a first read voltage control circuit and a first write voltage control circuit. The first reference voltage circuit is configured to provide a first reference voltage signal having a first voltage level to the memory array. The first read voltage control circuit is configured to adjust the first reference voltage signal to a second voltage level when the memory array is read. The first write voltage control circuit is configured to adjust the first reference voltage signal to a third voltage level when the memory array is written. The second voltage level is higher than the first voltage level, and the third voltage level is lower than the first voltage level.

Also disclosed is a memory device. The memory device includes a memory array, a first capacitor, a first switch and a second switch. The memory array is configured to operate according to a first reference voltage signal at a first node. The first capacitor is coupled between the first node and a second node. The first switch is configured to provide a second reference voltage signal to the first node. The second switch is configured to provide the second reference voltage signal to the second node when the first switch is turned off.

Also disclosed is a method. The method includes: providing a first reference voltage signal from a first node to a memory array; providing a second reference voltage signal to the first node; isolating a first capacitor from the first node when the second reference voltage signal has a first voltage value; and coupling the first capacitor to the first node when the second reference voltage signal has a second voltage value different from the first voltage value.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A memory device, comprising:
   a memory array;
   a first reference voltage circuit configured to provide a first reference voltage signal having a first voltage level to the memory array at a first node;
   a first read voltage control circuit configured to adjust the first reference voltage signal to a second voltage level when the memory array is read; and
   a first write voltage control circuit configured to adjust the first reference voltage signal to a third voltage level when the memory array is written,
   wherein the second voltage level is higher than the first voltage level, and
   the third voltage level is lower than the first voltage level
   the first reference voltage circuit comprises a first switch, a second switch and a logic gate,
   an input terminal of the logic gate is coupled to a control terminal of the first switch, an output terminal of the logic gate is coupled to a control terminal of the second switch, and
the first switch and the second switch are coupled to each other at the first node.

2. The memory device of claim 1, further comprising:
a capacitor coupled between the first node and a second node,
wherein the first switch is configured to provide a second reference voltage signal having the first voltage level to the first node, and
the first read voltage control circuit is configured to provide the second reference voltage signal to the second node when the first switch is turned off.

3. The memory device of claim 2, wherein the first read voltage control circuit comprises:
a third switch configured to provide the second reference voltage signal to the second node; and
a fourth switch configured to discharged the second node when the third switch is turned off.

4. The memory device of claim 1, further comprising:
a first capacitor configured to pull low the first node,
wherein the first write voltage control circuit comprises a third switch coupled between the first node and the first capacitor,
the first reference voltage circuit is configured to provide the first reference voltage signal from the first node to the memory array,
when the first reference voltage circuit is configured to provide a second reference voltage signal having the first voltage level to the first node,
when the second reference voltage signal has a first voltage value, the third switch is turned off, and
when the second reference voltage signal has a second voltage value larger than the first voltage value, the third switch is turned on.

5. The memory device of claim 4, further comprising:
a second capacitor configured to pull low the first node,
wherein the first write voltage control circuit comprises a fourth switch coupled between the first node and the second capacitor,
when the second reference voltage signal has a third voltage value larger than the second voltage value, the fourth switch is turned on.

6. The memory device of claim 1, further comprising:
a second reference voltage circuit configured to provide a second reference voltage signal having the first voltage level to a first memory cell column of the memory array;
a second read voltage control circuit configured to adjust the second reference voltage signal to the second voltage level when the first memory cell column is read; and
a second write voltage control circuit configured to adjust the first reference voltage signal to the third voltage level when the first memory cell column is written,
wherein the first reference voltage circuit is configured to provide the first reference voltage signal to a second memory cell column different from the first memory cell column.

7. The memory device of claim 6, further comprising:
a capacitor configured to pull low the first reference voltage signal and configured to pull low the second reference voltage signal,
wherein the first write voltage control circuit comprises a third switch coupled between the first reference voltage circuit and the capacitor, and
the second write voltage control circuit comprises a fourth switch coupled between the second reference voltage circuit and the capacitor.

8. The memory device of claim 6, further comprising:
a first capacitor coupled between the first reference voltage circuit and the first read voltage control circuit; and
a second capacitor coupled between the second reference voltage circuit and the second read voltage control circuit,
wherein the first read voltage control circuit is configured to pull high the first reference voltage signal through the first capacitor,
the first read voltage control circuit is configured to pull high the second reference voltage signal through the second capacitor, and
the first capacitor and the second capacitor correspond to the same conductive segment.

9. A memory device, comprising:
a memory array configured to operate according to a first reference voltage signal at a first node;
a first capacitor coupled between the first node and a second node;
a first switch configured to provide a second reference voltage signal to the first node; and
a second switch configured to provide the second reference voltage signal to the second node when the first switch is turned off.

10. The memory device of claim 9, further comprising:
a third switch configured to discharged the second node when the first switch is turned on.

11. The memory device of claim 10, further comprising:
an inverter configured to receive an enable signal indicating read operations of the memory array,
wherein an output terminal of the inverter is coupled to a control terminal of the third switch, and
a control terminal of the second switch is configured to receive the enable signal.

12. The memory device of claim 9, further comprising:
a second capacitor coupled to a third node and configured to receive a third reference voltage signal;
a third capacitor configured to receive the third reference voltage signal;
a third switch coupled between the third node and the third capacitor; and
a fourth switch coupled between the third node and the first node.

13. The memory device of claim 12, wherein the third switch is turned off when the second reference voltage signal has a first voltage value, and
the third switch is turned on when the second reference voltage signal has a second voltage value.

14. The memory device of claim 13, further comprising:
a fourth capacitor configured to receive the third reference voltage signal; and
a fifth switch coupled between the third node and the fourth capacitor,
wherein the fifth switch is turned on when the second reference voltage signal has a third voltage value, and is turned off when the second reference voltage signal has the first voltage value or the second voltage value.

15. The memory device of claim 12, further comprising:
a fifth switch coupled between the third node and the third capacitor;
a sixth switch coupled between the third node and a fourth node; and
a seventh switch configured to provide the second reference voltage signal to the fourth node, wherein a first memory cell column of the memory array and a second memory cell column of the memory array are coupled to the first node and the fourth node, respectively.

16. The memory device of claim 15, further comprising:

an eighth switch configured to provide the second reference voltage signal to a fifth node when the seventh switch is turned off; and a fourth capacitor coupled between the fourth node and the fifth node.

17. A method, comprising:

providing a first reference voltage signal from a first node to a memory array;

providing a second reference voltage signal to the first node;

isolating a first capacitor from the first node when the second reference voltage signal has a first voltage value; and coupling the first capacitor to the first node when the second reference voltage signal has a second voltage value different from the first voltage value.

18. The method of claim 17, further comprising:

coupling a second capacitor to the first node when the second reference voltage signal has a third voltage value different from each of the first voltage value and the second voltage value; and isolating the third voltage value from the first node when the second reference voltage signal has the first voltage value or the second voltage value.

19. The method of claim 17, further comprising:

in response to a read operation of the memory array, providing the second reference voltage signal to a second node, to pull high the first reference voltage signal through a second capacitor.

20. The method of claim 19, further comprising:

discharging the second node when the read operation terminates.

\* \* \* \* \*